(12) United States Patent
Newman et al.

(10) Patent No.: US 9,689,687 B2
(45) Date of Patent: Jun. 27, 2017

(54) GENERATING NAVIGATION DATA

(71) Applicant: The Chancellor Masters and Scholars of the University of Oxford, Oxford, Oxfordshire (GB)

(72) Inventors: Paul Michael Newman, Oxfordshire (GB); Winston Samuel Churchill, Oxfordshire (GB)

(73) Assignee: The Chancellor Masters and Scholars of The University of Oxford, Oxford (GB)

( * ) Notice: Subject to any disclaimer, the term of this patent is extended or adjusted under 35 U.S.C. 154(b) by 0 days.

(21) Appl. No.: 14/386,278

(22) PCT Filed: Mar. 13, 2013

(86) PCT No.: PCT/GB2013/050613
§ 371 (c)(1),
(2) Date: Sep. 18, 2014

(87) PCT Pub. No.: WO2013/140133
PCT Pub. Date: Sep. 26, 2013

(65) Prior Publication Data
US 2015/0057921 A1 Feb. 26, 2015

(30) Foreign Application Priority Data
Mar. 19, 2012 (GB) .................. 1204750.2

(51) Int. Cl.
G05D 1/00 (2006.01)
G01C 21/30 (2006.01)
(Continued)

(52) U.S. Cl.
CPC .......... G01C 21/30 (2013.01); G05D 1/0246 (2013.01); G05D 1/0274 (2013.01);
(Continued)

(58) Field of Classification Search
CPC .... G01C 21/30; G05D 1/0246; G05D 1/0274; G06K 9/00664; G06K 9/66; G09B 29/004
(Continued)

(56) References Cited

U.S. PATENT DOCUMENTS 5,144,685 A * 9/1992 Nasar ................... G05D 1/0246
348/119
5,961,571 A * 10/1999 Gorr ....................... G01S 3/783
340/988

(Continued)

FOREIGN PATENT DOCUMENTS

CN 101046387 A 10/2007
WO 2013140133 A1 9/2013

OTHER PUBLICATIONS

International Preliminary Report on Patentability received for Patent Application No. PCT/GB2013/050613, mailed on Oct. 2, 2014, 9 pages.

(Continued)

Primary Examiner — Ian Jen
(74) Attorney, Agent, or Firm — Finch & Maloney PLLC

(57) ABSTRACT

Navigation data is generated by receiving (502) a new experience data set (321) relating to a new experience capture. At least one stored experience data set (320) relating to at least one previous experience capture is also received (504). An experience data set includes a set of nodes, with each node comprising a series of visual image frames taken over a series of time frames. A candidate set of said nodes is obtained (506) from the stored experience data set that potentially matches a said node in the new experience data set, and then a check (508) if performed to see if a node in the candidate set matches the node in the new experience data set. If the result of the checking is positive then data relating to the matched nodes is added (510) to a place data (Continued)

set useable for navigation, the place data set indicating that said nodes in different said experience data sets relate to a same place.

20 Claims, 7 Drawing Sheets

(51) Int. Cl.
G05D 1/02 (2006.01)
G06K 9/00 (2006.01)
G06K 9/66 (2006.01)
G09B 29/00 (2006.01)

(52) U.S. Cl.
CPC ........... *G06K 9/00664* (2013.01); *G06K 9/66* (2013.01); *G09B 29/004* (2013.01)

(58) Field of Classification Search
USPC .......................................................... 701/430
See application file for complete search history.

(56) References Cited

U.S. PATENT DOCUMENTS

| 6,128,571 | A | * | 10/2000 | Ito | G01C 21/3679 |
| | | | | | 340/995.24 |
| 6,826,472 | B1 | * | 11/2004 | Kamei | G01C 21/3605 |
| | | | | | 340/995.19 |
| 8,289,390 | B2 | * | 10/2012 | Aggarwal | G01S 3/7864 |
| | | | | | 340/522 |
| 8,374,390 | B2 | * | 2/2013 | Stroila | G06K 9/00818 |
| | | | | | 382/103 |
| 2004/0083133 | A1 | * | 4/2004 | Nicholas | G06Q 30/02 |
| | | | | | 705/14.52 |
| 2004/0117109 | A1 | * | 6/2004 | Kodani | G01C 21/32 |
| | | | | | 701/455 |
| 2004/0249565 | A1 | * | 12/2004 | Park | G01C 21/36 |
| | | | | | 701/410 |
| 2005/0004749 | A1 | * | 1/2005 | Park | G01C 21/3647 |
| | | | | | 701/412 |
| 2007/0083325 | A1 | * | 4/2007 | Baba | G01C 21/367 |
| | | | | | 701/457 |
| 2010/0094460 | A1 | * | 4/2010 | Choi | B25J 9/1692 |
| | | | | | 700/251 |
| 2010/0176987 | A1 | * | 7/2010 | Hoshizaki | G01S 19/48 |
| | | | | | 342/357.23 |
| 2014/0172864 | A1 | * | 6/2014 | Shum | G06F 19/322 |
| | | | | | 707/740 |

OTHER PUBLICATIONS

International Search Report and Written Opinion of the International Searching Authority received for Patent Application No. PCT/GB2013/050613, mailed on Jun. 24, 2013, 13 pages.

GB Intellectual Property Office Search Report under Section 17(5) received for GB Patent Application No. 1204750.2 mailed Jul. 10, 2012, 3 pages.

M. Cummins, et al., "FAB-Map: Probabilistic Localization and Mapping in the Space of Appearance," The International Journal of Robotics Research, vol. 27, No. 6, Jun. 1, 2008, 20 pages.

* cited by examiner

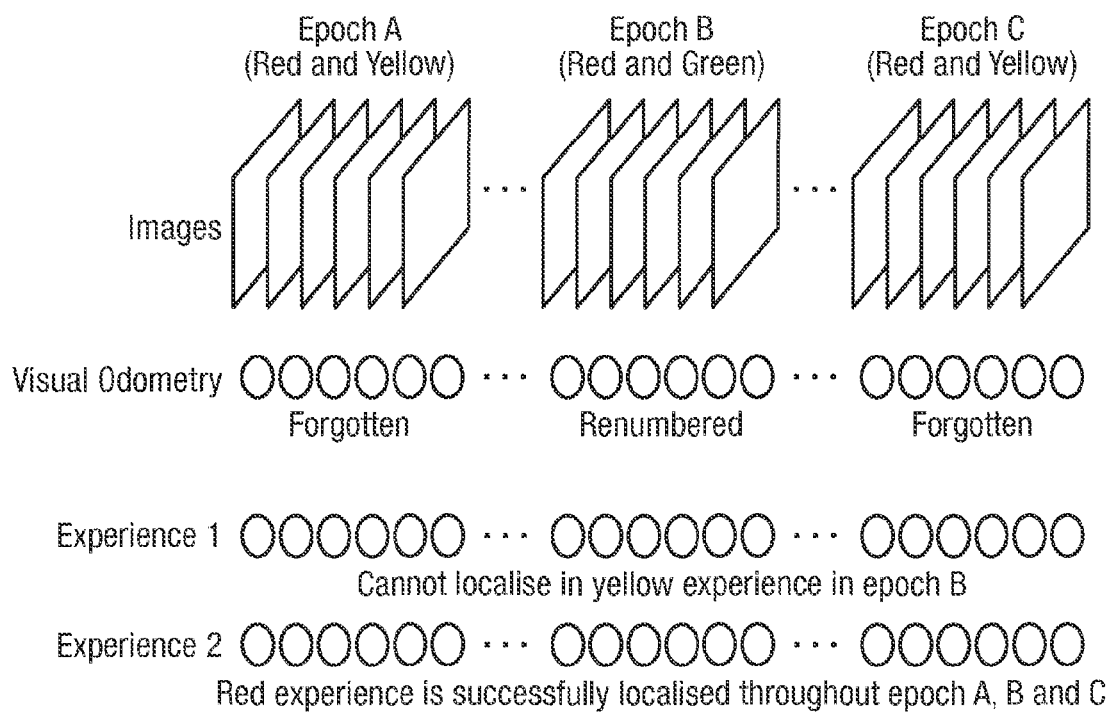
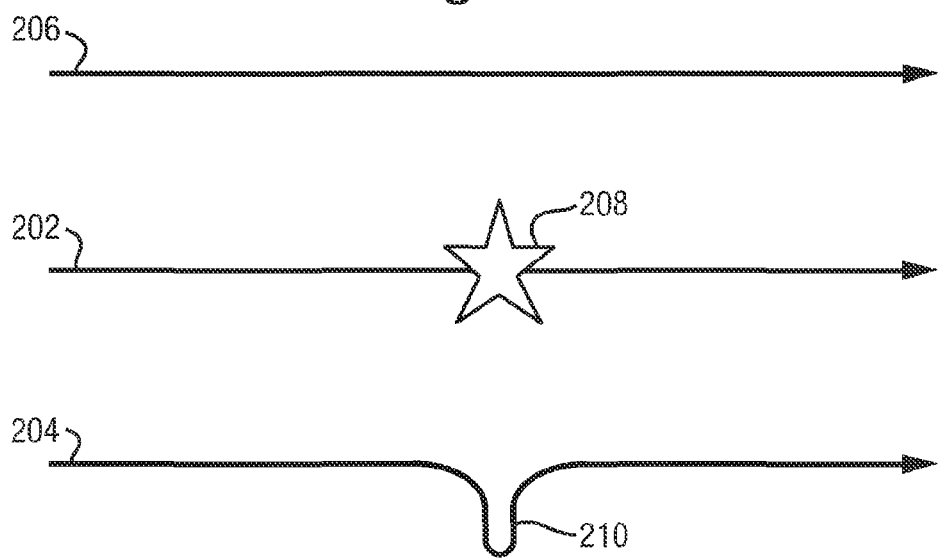

GENERATING NAVIGATION DATA

The present invention relates to generating navigation data.

To achieve long term autonomy robotic systems must be able to function in changing environments. Change can come from many sources, such as sudden structural change, lighting conditions, time of day, weather and seasonal change. Such changes can be relevant to the problem of ego-motion estimation with a camera mounted on a robot operating outdoors. A known solution is to use a visual navigation (Simultaneous Localisation And Mapping) system that can map the space around the vehicle and also localise/locate the vehicle within that space. However, if the place is subsequently revisited by the vehicle and its appearance has changed drastically, for example due to snow, then this known approach will only have limited success.

The present inventors have previously devised an alternative approach to this long term localisation problem (details of which are included in UK Patent Application No. 1202344.6 filed on 10 Feb. 2012; applicant: Isis Innovation Limited; title: "Method of Locating a Sensor and Related Apparatus", the contents of which are hereby incorporated by reference). When a workspace is initially visited a visual map, known as an experience, is saved. On subsequent visits, the system attempts to localise against this stored experience. If it is unsuccessful at any point, then a new experience is saved. As the vehicle continues saving to the new experience, in parallel it also attempts to re-localise in its previous experience. If the re-localisation is successful at any point, saving to the new experience is stopped. This is shown graphically in FIG. 1, where a Visual Odometry (VO) system continuously consumes the live image stream obtained by cameras onboard a vehicle. In parallel, a series of localisers attempt to localise each live frame in their own experience. In epochs A and C both localisers successfully localise the frames in their experiences and so the VO output is forgotten. In epoch B, localisation is only successful in one saved experience (experience 2), which is deemed too few, so the VO output is saved in a new experience. The collection of all experiences is known as a plastic map. In contrast to previous approaches, the plastic mapping system does not adopt a single frame of reference. When new experiences are stored, they live in their own frame of reference and only locally accurate. The advantage of this approach is that multiple experiences can cover the same physical space without being forced into the same frame of reference and localisation is trivially parallelised. The difficulty comes in knowing where different experiences cover the same physical space. It is therefore desirable to have some sort of linking between experiences.

An important aspect of the inventors' previous work, referred to generally as plastic mapping, is its ability to relocalise in previously saved experiences. If this was not possible then even if the starting position in an experience was known then the experience would then only be useful until localisation failure, even though it may later be relevant. The failure could occur because of a short term change in visual appearance, or the vehicle taking a slight detour from the previous route. If the failure results in a new experience being created, and the prior experience becomes relevant again, the system will continue to save the new experience unnecessarily, because it is unaware of the prior experience. This is illustrated graphically in FIG. 2, which illustrates two live VO systems 202, 204 running and localising against a saved experience 206. In the first case 202, a localisation failure 208 happens half way along. In the second case 204, the vehicle takes a small detour 210. In each case the second half of the saved experience 206 is still relevant to the live VO, but if re-localisation is not possible it will not be used.

Experiences in the plastic mapping approach are in a relative frame, not a global world frame, and so position look-up is not trivial. There are several ways experience re-localisation can be achieved. Firstly is through the use of an external loop closer such as the known FAB-MAP algorithm (see M. Cummins and P. Newman, "Highly Scalable Appearance-Only SLAM FAB-MAP 2.0," in Robotics Science and Systems, 2009), where the live image is matched to a place in the saved experience. Secondly, the experience can be marked with meta data, such as specific Global Positioning System way points, or higher order descriptions such as known road junctions or buildings. Finally, an experience can be re-localised if another experience is being successfully localised in, and it is known that a certain place occurs in both. This topological link is known as a "place", and was introduced in the inventors' previous plastic mapping work. However, places could only be created when the live VO system was successfully localising in more than one experience, resulting in a limited number of links being created.

Embodiments of the present invention are intended to address at least some of the problems discussed above. Embodiments are intended to increase links between experiences in an offline step to generate navigation data that is useable by the vehicle when it next goes out so that it can better leverage its prior information and reduce unnecessary experience creation.

According to a first aspect of the present invention there is provided a method of generating navigation data, the method including or comprising:

receiving a new experience data set relating to a new experience capture, a said experience data set including a set of nodes, each said node comprising a series of visual image frames taken over a series of time frames;

receiving at least one stored experience data set relating to at least one previous experience capture;

obtaining a candidate set of said nodes from the at least one stored experience data set that potentially matches a said node in the new experience data set, and checking if a said node in the candidate set matches the node in the new experience data set, wherein if a result of the checking is positive then data relating to the matched nodes is added to a place data set useable for navigation, the place data set indicating that said nodes in different said experience data sets relate to a same place.

The new experience data set may comprise data received from a sensor operating online on a vehicle and steps of the method are performed subsequently offline, e.g. on a separate computing device.

The step of obtaining the candidate set of nodes can include:

finding any said node from the at least one stored experience data set that matches a said node in the new experience data set, the nodes both corresponding to a same time reference k, and adding a said node from the stored experience data set with a time reference k+1 to the candidate set.

The step of obtaining the candidate set of nodes can include:

finding any said node from the place data set that matches a said node in the new experience data set, and adding a neighbouring said node from the place data set to the candidate set.

The step of obtaining the candidate set of nodes can include:

finding any said node from the at least one stored experience data set that potentially matches a said node in the new experience data set according to an image matching algorithm, and adding the found node to the candidate set.

The image matching algorithm may comprise FAB-MAP.

The step of obtaining the candidate set of nodes can include:

finding any said node from the at least one stored experience data set that potentially matches a said node in the new experience data set according to geographical location indicators, and adding the found node to the candidate set.

A said geographical location indicator may be based on geographical data produced during capture of the experience data, e.g. using a Global Positioning System device.

The step of checking if a said node in the candidate set matches the node in the new experience data set can include:

creating a window of nodes ($\{m_c\}_w$) either side of a said node in the candidate set;

computing transforms from the node ($m^*$) in the new experience data set to each said node in the window;

if all the transforms are valid then computing translations from the node ($m^*$) in the new experience data set to each said node in the window ($\{m_c\}_w$), and if a local minima is found between the node ($m^*$) in the new experience data set and a said node in the window ($\{m_c\}_w$) then the node in the window with a smallest said translation is returned as matching the node ($m^*$) in the new experience data set.

A said experience data set may further include data relating to landmarks and the method may further include:

computing a transform from a said image frame of a said node in the new experience data set to said nodes in the stored experience data set having landmarks from a region surrounding a previous position of the node in the new experience data set.

The step of computing the transform can be performed in parallel for a plurality of said image frames in the new experience data set.

The method may include:

identifying said landmarks in a said experience data set using a FAST corner extractor technique, and using a Brief Robust Independent Elementary Features technique to associate corresponding said landmarks in different said experience data sets.

The place data set may be used by a navigation device of a vehicle. The vehicle may be at least partially autonomous.

According to another aspect of the present invention there is provided apparatus configured to generate navigation data, the apparatus including:

a device configured to receive a new experience data set relating to a new experience capture, a said experience data set including a set of nodes, each said node comprising a series of visual image frames taken over a series of time frames;

a device configured to receive at least one stored experience data set relating to at least one previous experience capture;

a device configured to obtain a candidate set of said nodes from the at least one stored experience data set that potentially matches a said node in the new experience data set, and a device configured to check if a said node in the candidate set matches the node in the new experience data set, wherein if a result of the checking is positive then data relating to the matched nodes is added to a place data set useable for navigation, the place data set indicating that said nodes in different said experience data sets relate to a same place.

According to other aspects of the present invention there are provided computer program elements comprising: computer code means to make the computer execute methods substantially as described herein. The element may comprise a computer program product.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 1 is a graphical overview of the previous plastic mapping approach;

FIG. 2 illustrates cases of unnecessary experience creation in the plastic mapping approach;

An overview of the inventors' previous plastic mapping work shall first be given in order to lead up to the present invention. A plastic map, PM, is made up of j experiences, denoted $_j\epsilon$. Each experience is the saved output from the VO system, and captures a visual representation of the world at the time of observation. Each experience can be represented graphically, where the stereo frames are represented as nodes and metric transformation information can describe how they are connected. Separate experiences can be formed into a single larger graph G, which contains all experiences. Inter-experience edges can then be added between experiences to indicate the nodes refer to the same physical place in the world. Each associated image is of the same place in the environment, so edges can be created between them.

Figure 3:
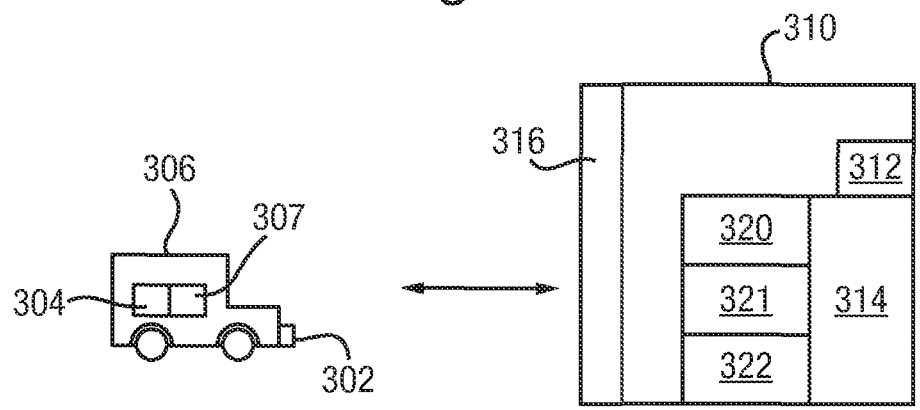
FIG. 3 is a schematic illustration of a vehicle and a remote processing device configured to generate navigation data according to an embodiment of the present invention.

FIG. 3 shows schematically a VO system comprising at least one sensor 302 connected to a computing device 304 on board a vehicle 306. The sensor(s) in the illustrated embodiment may be a stereoscopic camera, although it will be appreciated that alternative (active or passive) sensors, such as a laser scanner, could be used. The vehicle travels along a surface and the sensor captures visual image frames of the territory around the vehicle, including the surface and any surrounding objects or landmarks. The image frames are transferred to the on board computing device 304 and may be at least temporarily stored by it and are typically indexed by time frames. Although the example vehicle is a land-based vehicle, it will be appreciated that in alternative embodiments, the vehicle could be water or air borne.

The computing device 304 further includes a communications interface 307 that allows it to exchange data with a remote computing device 310, which includes a processor 312, memory 314 and its own communications interface 316. In alternative embodiments the image data may be transferred directly from the vehicle/sensor(s) 302 to the remote computing device. The image frames can be used to create data representing an experience c, as discussed above. The memory includes data 320 representing previously captured experiences, as well as the new experience data 321 and an application 322 configured to process experience data in order to produce enhanced navigation data that can be used in future, e.g. by a computing device on board the survey vehicle 306 (or the navigation system of any other at least partially autonomous vehicle that may traverse the same location in future).

For a sequence of stereo frames $F_k = \{F_0, \ldots, F_k\}$, taken at times k, the VO system produces nodes n. Each node $n_k$ represents the associated stereo frame $F_k$ and is linked to node $n_{k-1}$ by a 6 degree of freedom transform $t_k = [x, y, z, \square_r, \square_p, \square_q]^T$ where $\square_r, \square_p$ and $\square_q$ are roll, pitch and yaw, respectively. If new 3D landmarks are initialised as $F_k$ is processed then these are also attached to $n_k$. The ith such landmark attached to $n_k$, where i is a global index (and so every landmark has a unique identifier), is denoted as $I_{i,k} = [x, y, z]^T$ – a vector in the camera frame at time k. $n_k$ also contains a list of all landmarks observed in $F_k$, many of which will be attached to other nodes—the ones in which they were initialised. It is often desirable to express a landmark described in frame p in a different frame q. This operation of transforming $I_{*,p}$ to $I_{*,q}$ is represented by $^p\Pi_q$ such that $$I_{*,q} \leftarrow {}^p\Pi_q(I_{*,p}) \tag{1}$$

The VO system runs continuously on the live frame stream. When this needs to be saved a new experience $^j\epsilon$ is created and the output from the VO system is stored in this experience. $^j\epsilon$ can therefore comprise a chain of camera nodes, the inter-node transforms and associated 3D features. Nodes in experiences are referred to as $^j\epsilon m$.

In the plastic mapping work the inventors also introduced the notion of a localiser. Each localiser runs over a saved experience, given a live frame $F_k$, its task is to calculate the transformation from the frame to a node in the experience. It operates in a similar way to the live VO system except the proposed landmark set comes from the saved experience, not the previous frame $F_{k-1}$. The landmarks are taken from the local region surrounding the previous position in the experience. A landmark may be considered to be a surrounding one by appearing in a fixed window size either side of the previous position in terms of frame number (it will be understood that such frames can contain features/landmarks that can be an arbitrary distance away). Additionally, the localiser does not attempt to add or update landmarks in either the current VO output or the saved experience. It is completely passive in terms of its impact on both.

An important competency of the localiser is its ability to tell if it is "lost". This happens when the incoming frame can no longer be localised in the previous experience. There are many ways this can be calculated. Possibilities include the number of landmarks found and/or classified as inliers, and comparisons with the current VO output. The output of each localiser at each time step is a binary result indicating if it is still successfully localised:

$$L(^j\varepsilon, \mathcal{F}_k) = \begin{cases} 1 & \text{if localised} \\ 0 & \text{if lost} \end{cases} \tag{2}$$

If successful, the localiser can be queried for the node in the experience to which $F_k$ was nearest:

$$m \leftarrow {}^j\epsilon(\mathcal{F}_k) \tag{3}$$

Once a localiser is declared lost, it stays in this state until receives outside assistance. For each saved experience it is necessary to ensure that it is always being used when appropriate, otherwise the saved information is wasted and it likely that more experiences than needed will be saved. This results in more representations of the environment being saved than needed and undesired redundancy in the system. The problem of when to use an experience occurs in two places, but can be thought of as the same problem. The first is when to initialise an experience. Consider a robot traveling from a relatively unchanging area to one of high visual variance, it needs to know when to activate the appropriate experiences related to that area. The second place is when an experience becomes "lost", but becomes relevant again sometime later. The plastic map stores many experiences that cover an unbounded spatial area, in addition to capturing different appearances of the same area, thus they will not all be relevant all the time. As experiences are not stored in a single global frame of reference it is not possible to integrate the local transforms to estimate the position in one from another.

In practice these problems can be considered to be the same, given a new frame $F_k$ and a set of localisers that were successful for frame $F_{k-1}$, which localisers should be used for $F_k$. The previous set of successful localisers is a good start, but new localisers that are appropriate should be included. One approach would be to use a vision based recall system like the known FABMAP algorithm to select appropriate places in previous experiences, but solely depending on such a system is likely to be sub-optimal due to the low recall rate. As a second aid, the concept of places was introduced in the plastic mapping work, which are topological links between experiences. All places are referred to as P and the zth place as $P^z$. $P^z = \{^j\epsilon_m\}$, is the set of all nodes (taken from various experiences) which are known to have been concurrently localised against. This is a set of camera frames viewing the same physical place.

Figure 4:
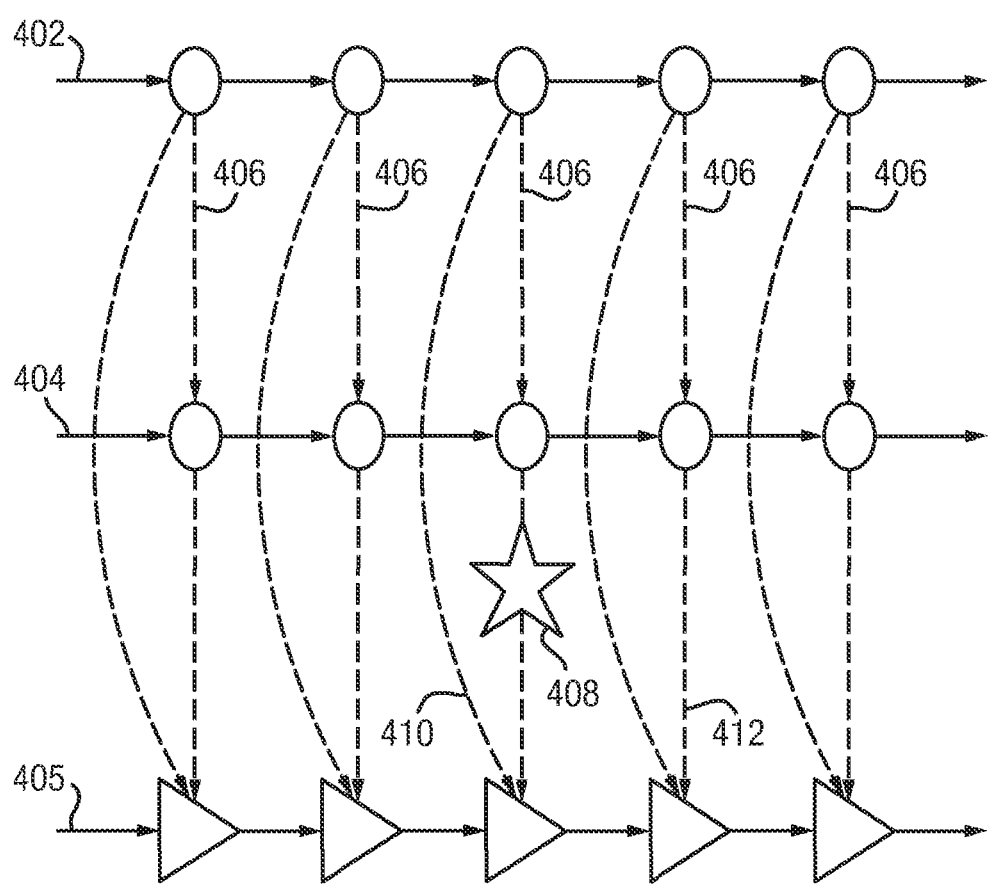
FIG. 4 illustrates how topological places can aid experience-driven re-localisation.

FIG. 4 shows how places can aid experience driven re-localisation. Consider two experiences 402, 404 being successfully localised in when processing a VO feed 405. There are also marked "places" (links 406) between the experiences. When localisation fails (shown by star 408) in the second experience 404, it is able to re-localise though its link 410 to the first experience 402, with the link 412 to the second experience 404 being restored for the next node.

Given a set of active and successful localisers from the previous frame $F_{k-1}$, it is possible to query all places with their associated nearest nodes, to get other positions in other, related experiences. This allows active localisers to initialise new experiences or "restart" lost localisers. In the previous plastic mapping work, places were created or updated when $F_k$ was simultaneously localised in more than one experience. However, this limits the system to place modification only when running live. The inventors therefore further considering performing additional analysis on the recorded data between visits to an environment, e.g. when the vehicle returns to base, or any other time when the recorded data can be analysed offline, with a view to using the enhanced data for navigation. The inventors therefore propose a new system for increasing the number of places in an offline set, which can lead to better connected experiences, which can be more easily utilised on the next visit.

Given a new experience $^j\epsilon^*$, it is desirable to maximally connect it to all previous experiences that are relevant. In one embodiment this is done in a two stage algorithm. For each node, a candidate set of nodes from at least one previous experience is first presented that might be the same place. A robust localisation is then used to ensure they really are the same place. This is shown using the above notation in the algorithm below. If a suitable match has been found then the appropriate place $P^z$ is updated.

--- while Places have been updated do
    for all m* ∈ $\epsilon^*$ do
        for all $^j\epsilon$ ∈ PM do
            {$^j\epsilon_m$} = ComputeCandidateMatches($^j\epsilon$,m*)
            $m_s$ = ComputeBestMatch({$^j\epsilon_m$})
            $P^z$ = $P^z$ ∪ {m*,$m_s$}
        end for
    end for
end while

---

Figure 5:
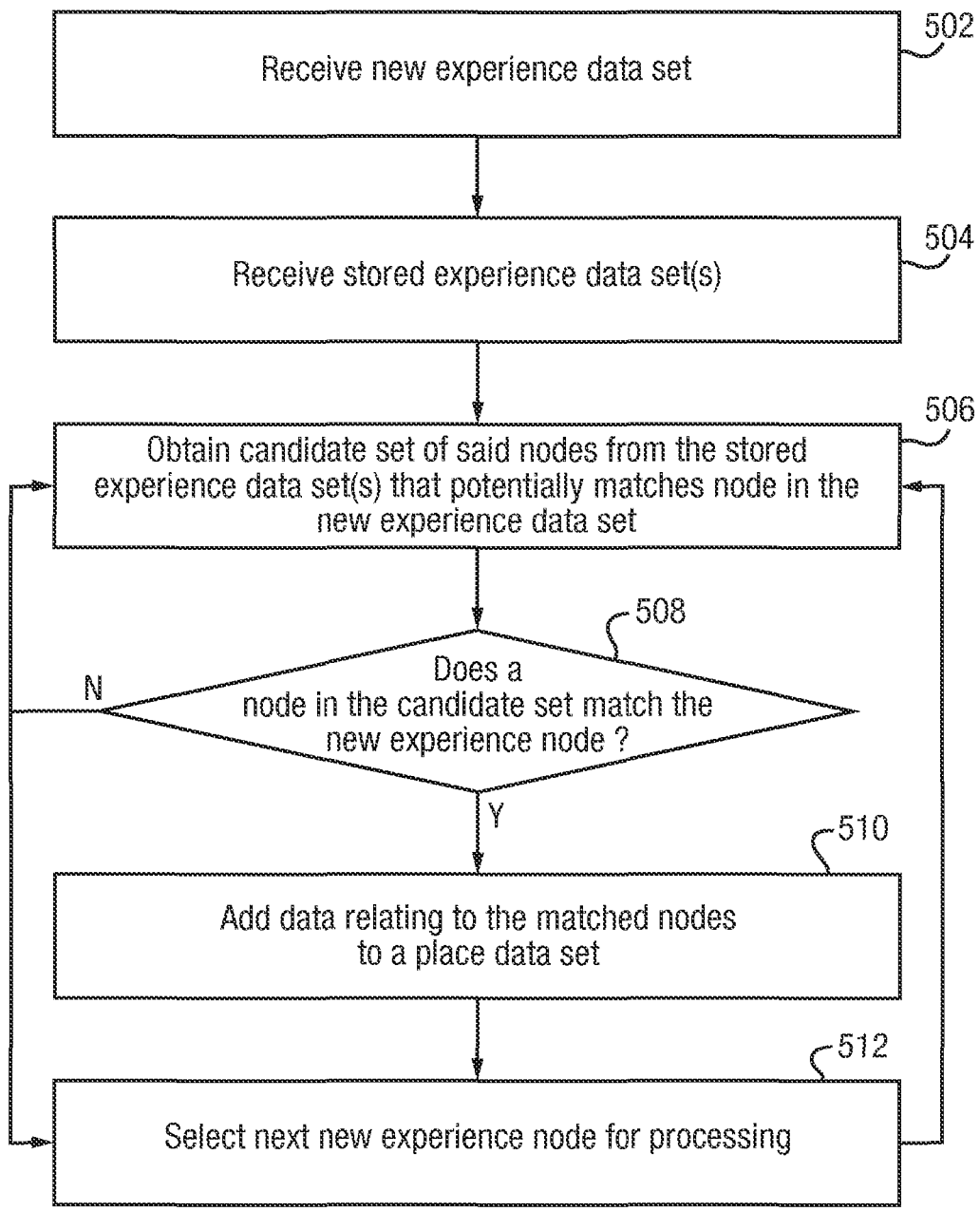
FIG. 5 is a flowchart showing steps performed by a processing device configured to generate navigation data.

FIG. 5 illustrates schematically an example of this method. At step 502, data representing a new experience recorded by the vehicle 306 is received, e.g. data that has been transmitted wirelessly from the vehicle to the remote computing device 310, on which the application 322 is executing the method. It will be appreciated that the format and presentation of the data can vary.

At step 504, data representing at least one stored experience is received by the computing device 310, e.g. retrieved from its memory 314. This data will normally, but not necessarily, be in the same format as the new experience data. The application 322 will also use place data that includes links between nodes in more than one of the experiences in the stored experience data that are known to be the same place. This place data may be part of the known experience data or may be a separate data structure/file.

The intention of the application 322 is to find links between nodes in the stored experience data and nodes in the new experience data. Matching a node from a new experience to all previous nodes is very expensive and error prone due to the very large and mostly unrelated previous nodes. Therefore, it is desirable to provide a candidate set of nodes to the robust matcher (step 508 below) that are nearly in the right place and mostly relevant, in order to reduce computation time and onus on the robust matcher.

At step 506, a set of candidate nodes from the stored experience data is selected on the basis that they may match the node in the new experience data (this new experience data node may initially be the first node in the data set or may be initially selected in some other way). Candidate matching nodes can be selected in one or more ways. For example, if any places contain the new experience node then neighbours of that node (in terms of position) can be suggested as candidates. In another example, if a stored experience node at time k links to a node in the new experience at time k then it is likely that nodes k+1 in both experiences could match. This can be called recursively until no changes have been made to the places set. It is also possible to use image matching techniques, such as the known image matching algorithm FAB-MAP, to propose candidate matches. Further, geographical location data, e.g. location data tagged to a node using a GPS system during the capture of the experience, could be used to identify candidate nodes (i.e. nodes in the both the new and stored experience data that have been tagged with the same or similar geographical location). It should be noted that both these latter options only provide a very rough estimate of position and so refinement is required.

The application 322 then aims to ensure that a link is being created between two nodes that really are the same place. At step 508 a robust matching technique is used to reduce incorrect links. Given new node m* and a candidate node $m_c$, a small window (e.g. +/−25 frames either side of the candidate node) of nodes is taken either side of $m_c$, denoted $\{m_c\}_w$ and the transform from m* to each node in the window is computed. Next, assuming all transforms are valid, the translation from m* to each $\{m_c\}_w$ is computed. If a local minima is found, i.e. m* really does pass by the window $\{m_c\}_w$, then the candidate node in $\{m_c\}_w$ with the smallest translation to m" taken to be the same place. The associated data place is then updated at step 510. If none of the nodes in the candidate set match the new experience node then another set of candidate nodes may be produced (return to step 506), or another new experience node may be selected for processing as set out above (step 512).

A key property of the system is that once the set of relevant localisers has been computed, localisation of the current live frame in each one is independent and so can be run in parallel. Given that the data association and trajectory estimation steps dominate the computation time, by parallelising them it is possible to process frames at 15 Hz. To achieve robust data association Binary Robust Independent Elementary Features (BRIEF) descriptors (see M. Calonder, V. Lepetit, C. Strecha, and P. Fua, "BRIEF: Binary Robust Independent Elementary Features," in European Conference on Computer Vision, September 2010) can be used as these features are very fast to compute and match and only require a CPU. Feature extraction on the incoming frame is independent and can be performed once at the start. As most systems only have one or two GPUs at best, and the number of active localisers and VO system is often larger than this, the dependancy on a GPU makes parallelisation difficult, compared to running a CPU only program on a multi-core or multi-process system.

One embodiment of the VO system uses the FAST corner extractor (see E. Rosten, G. Reitmayr, and T. Drummond, "Real-time video annotations for augmented reality," in Advances in Visual Computing. LNCS 3840, December 2005, pp. 294-302) to compute points of interest. These are then passed to BRIEF descriptors to achieve fast robust data association. Matched landmarks can be refined to sub-pixel precision using efficient second-order matching (as described in C. Mei, S. Benhimane, E. Malis, and P. Rives, "Efficient homography based tracking and 3-d reconstruction for single-viewpoint sensors," IEEE Transactions on Robotics, vol. 24, no. 6, pp. 1352-1364, December 2008). The 6 Degrees of Freedom (DoF) transform is computed by an initial RANSAC estimation step and refined using a least squares optimisation. The 6 DoF transforms $t_k$ computed by the VO system, when compared to the same relative transforms computed by the vehicle INS (which is assumed to be ground truth) have a mean error of [−0.0093, −0.0041, −0.0420] meters and [−0.0239, 0.0021, 0.0040] degrees and standard deviation of [0.0225, 0.0245, 0.0155] meters and [0.0918, 0.0400, 0.0383] degrees.

To test the framework a test survey vehicle performed 53 traverses of two semi-overlapping 0.7 km routes around Begbroke Science Park, Oxfordshire, United Kingdom. Data was collected over a three month period at different times of day and with different weather conditions using the survey vehicle. An outer loop around the site was driven on the first 47 traverses while the last 6 traverses went via an inner loop. For illustrative purposes, the signal from the external loop closer was controlled so it only fired at 14 predefined points on each loop. The points were spaced approximately evenly along each loop.

To test the importance of places, three versions of the navigation data generation method were used. The first was denoted as "Live Places", where places were only created or updated by the live VO system (as in the previous plastic mapping work). Second, results were taken for a "No Places" implementation, which didn't use the place model for restarting lost localisers (but they were used for starting localisers in the first place). Finally, the new method described herein, called "Offline Places", was also used, where more places were created between each run of data collection. In this experimental implementation GPS information was mainly used for candidate matches.

Figure 6:
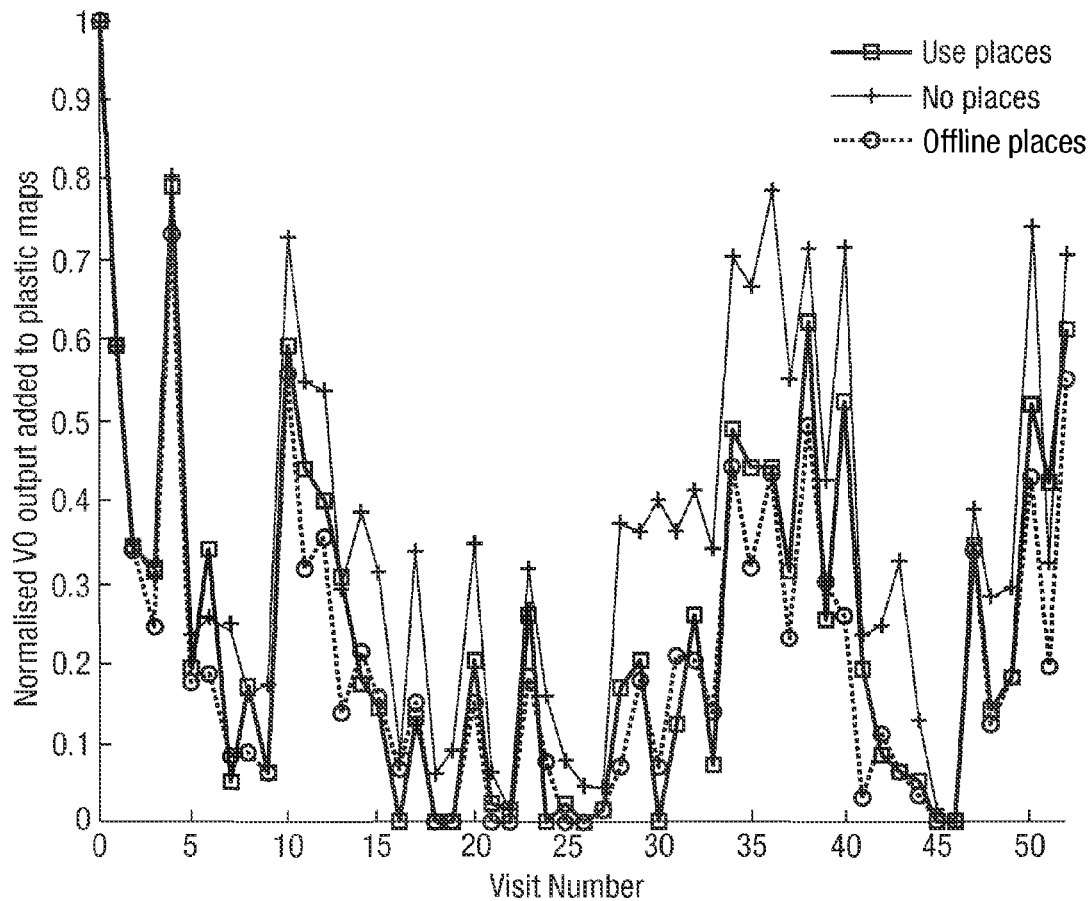
FIGS. 6 to 9 are graphs illustrating example system performance.
Figure 7:
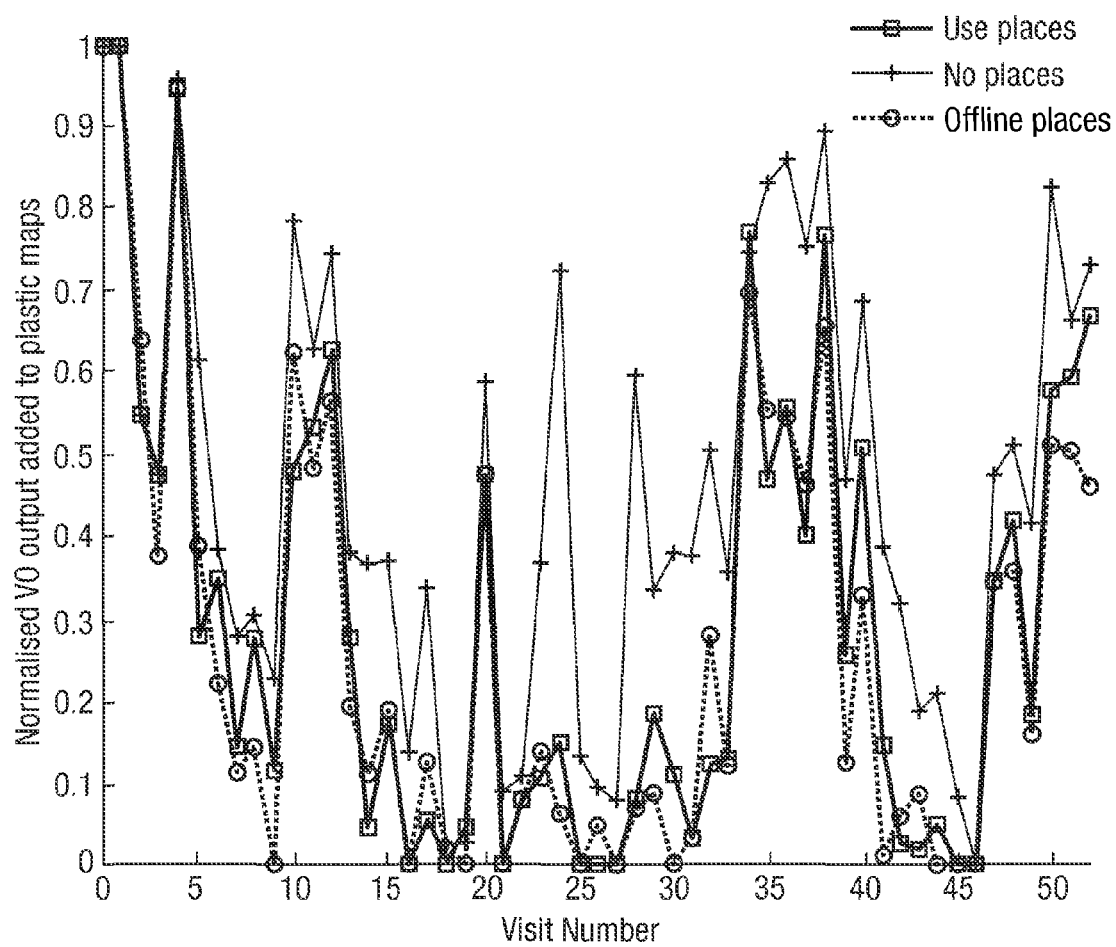
Figure 8:
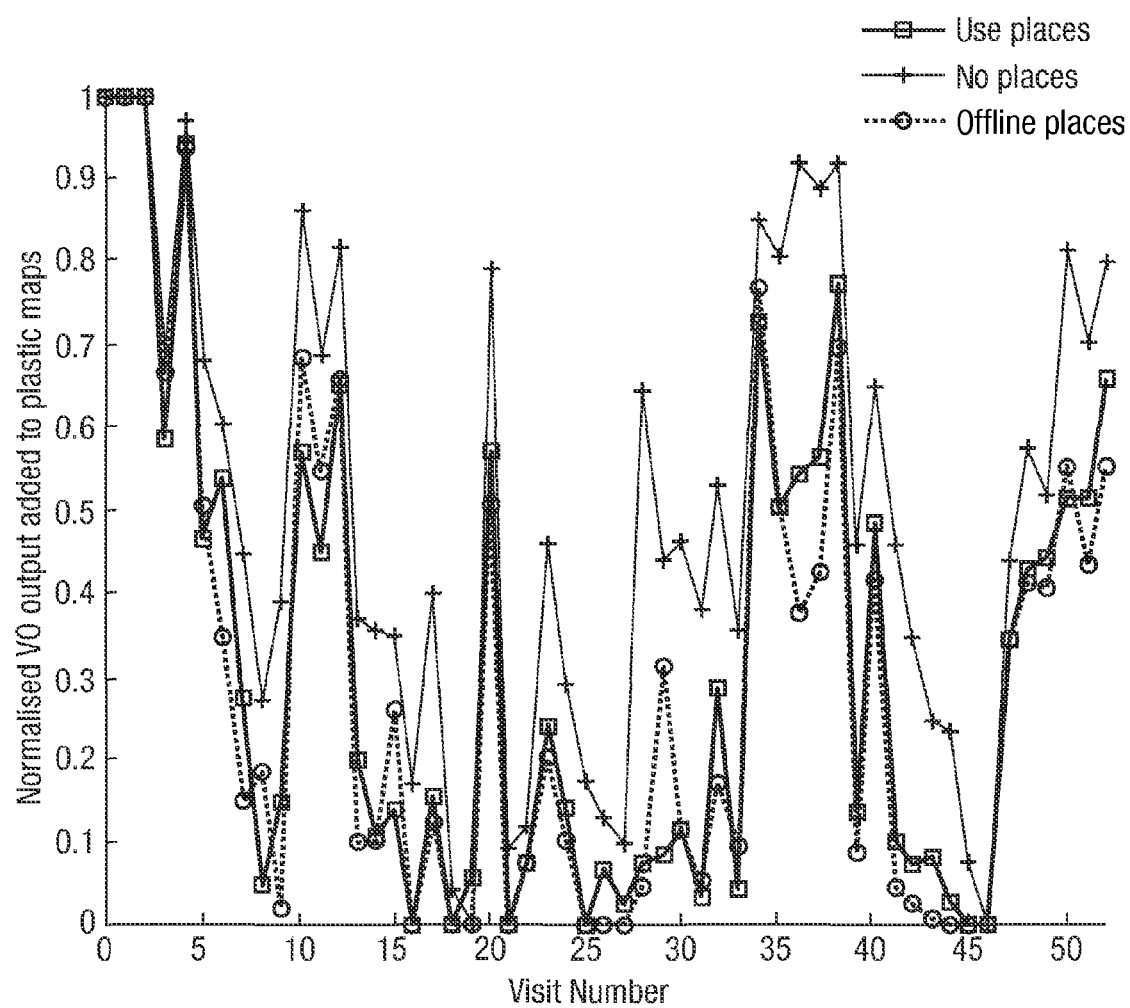

Results for the minimum number of localisers N=1, 2 and 3 are given in FIGS. 6, 7 and 8, respectively. It will be noted how each graph follows approximately the same trend, which matches what the data did. On runs 35-38 the vehicle was driven for the first time at dusk with large pools of water on the road, something that had not been experienced before. This resulted in a spike of the number of experiences saved. A second spike occurs from run 47 onwards where the inner loop started to be driven over. Again, this caused new experiences to be saved as the place has not been visited before. It will be noted how in each graph the Offline Places implementation does not always out perform Live Places implementation. This is because performance on a particular run is tied directly to what was saved before. As the Live Places saves more than is necessary early on, on some later runs it could perform better than Offline Places because it has more experiences from which to draw. However, over all runs the Offline Places model outperformed the Live Places system. This can be seen in the table below.

Percentage of Saved Output (Lower is Better). Note that Offline Places, the System with the Most Links Between Experiences Performs Best

|  | Live Places | No Places | Offline Places |
| --- | --- | --- | --- |
| N = 1 | 23.81% | 35.61% | 20.27% |
| N = 2 | 27.01% | 44.83% | 24.82% |
| N = 3 | 28.43% | 48.53% | 26.67% |

Over all 53 runs the Offline Places model saved fewer experiences than Live Places, demonstrating that it made better use of what is has saved. Both systems outperformed the No Places implementation.

In another version of the experiment, four variants of the navigation data generation approach were tested:
  No Discovery—inter-experiences edges only contain experience beginnings. This enables experiences to be started if they are not active, but prevents the re-initialisation of lost experiences.
  Live Discovery—inter-experience edges created when the live VO system successfully localises in more than one experience (this corresponds to the approach taken in the previous plastic mapping work). This means that G (a graph containing all stored experiences) was only changed when the vehicle was being driven, and only in the regions covered by the vehicle on that trip. For example, if the previous sortie included the car park, but was not included on the next outing, the car park section cannot be connected to other experiences of that area. This dependency on the live system to create edges is undesirable.
  GPS Discovery—inter-experience edges between nodes generated from closest GPS points.
  Refined Discovery—candidate inter-experience edges suggested from GPS and then refined using robust image matching. The total percent of saved frames for each of these variants is shown in the table below:

Percentage of Saved Output (Lower is Better). GPS and Refined Discovery Methods Work Best

|  | Discovery Type | | | |
| --- | --- | --- | --- | --- |
|  | No Discovery | Live | GPS | Refined |
| N = 1 | 34.93% | 23.35% | 19.89% | 17.05% |
| N = 2 | 43.95% | 26.48% | 24.33% | 21.16% |

The above numbers are the fraction of the maximum amount of experience data that could be saved, i.e. if all VO output was stored. As experience creation is driven by localisation failure, a lower number indicates that the system is performing better, i.e. it is localised for longer and is lost less. Performing Refined Discovery results in a 27% and 20% improvement for N=1 and 2, respectively, when compared to the previous plastic mapping work, Live Discovery. GPS Discovery did not perform as well as Refined Discovery. This is likely to be caused by the quality of the inter-experience edges in G being substandard due to the drift experienced by GPS.

Figure 9:
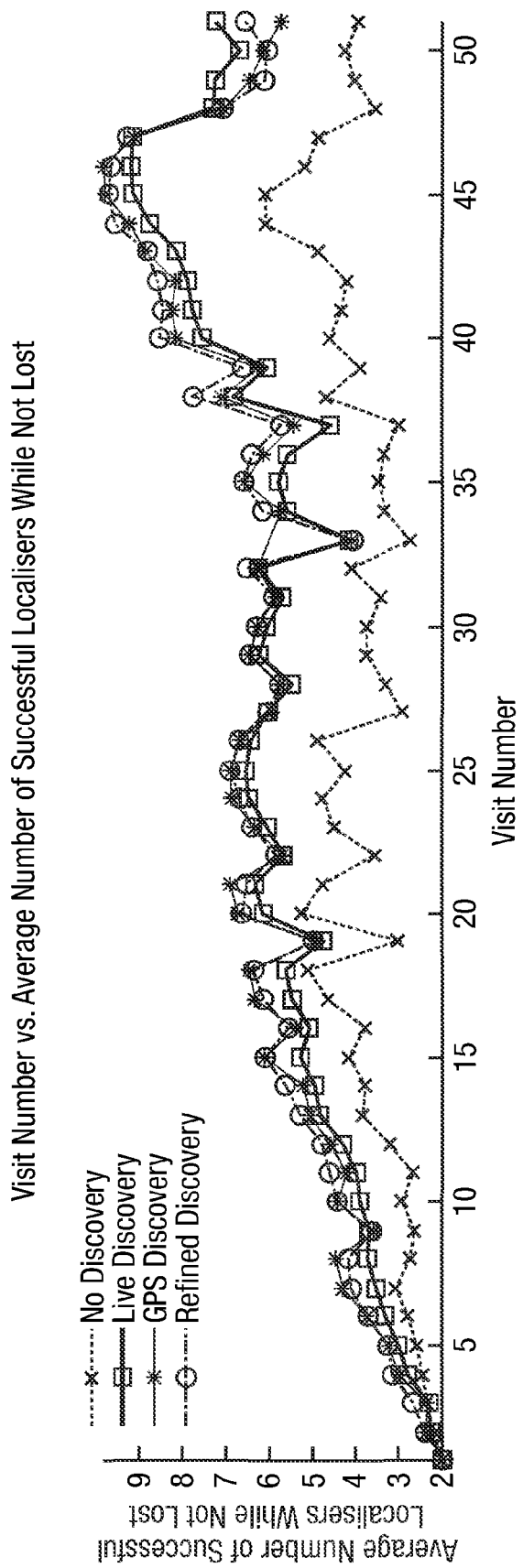

FIG. 9 shows, for each visit, the average number of successful localisers while the system is not lost. It can be seen that both variants that process newly saved experiences between outings generally record a higher number of successful localisers for each run. Given they also store less experiences, this implies they are making much better use of the information they already have stored. The GPS and Refined Discovery variants both spend time after a run to perform better matching of newly saved experiences and had a higher number of successful localisers. By increasing the quantity and quality of edges in G, it has been shown that it is possible to stay localised for longer and less experience data needs to be saved, as better use is made of the current information.

The experimental results show that the previous plastic mapping continuous localisation of a road vehicle can be improved by using the new offline step between data collection runs. Previously the inventors showed that ongoing localisation could be achieved by saving distinct visual experiences, but that leveraging these when needed is not trivial because the system does not adopt a single frame of reference for experiences. The previous plastic mapping work introduced the notion of places which link experiences topologically, which allows experiences to aid each other in start-up and re-initialisation. In the prior work, these were only created or updated when online, which limited the information sharing between places. The embodiments described herein introduce a new offline step that increases the connectivity of experiences. On future runs this allows the system to better leverage the information it already has and results in more efficient performance.

The invention claimed is:
1. A method of generating navigation data, the method including:
   receiving
      a new experience data set relating to a new experience capture, and
      at least one stored experience data set relating to at least one previous experience capture,
      each of the new experience data set and the at least one stored experience data set including a set of nodes, each said node comprising a series of visual image frames relating to a geographical location taken over a series of time frames;
   obtaining a candidate set of said nodes from the at least one stored experience data set that potentially relate to a same geographical location of a said node in the new experience data set;
   checking whether the geographical location of a said node in the candidate set matches the geographical location of the node in the new experience data set; and
   responsive to the matching, adding, to a place data set usable for navigation, a topological link that relates the node in the candidate set to the matched node in the new experience data set.

2. A method according to claim 1, wherein the new experience data set comprises data received from a sensor operating online on a vehicle and the method is performed subsequently offline on a computing device.

3. A method according to claim 1, wherein obtaining the candidate set of nodes includes:
   finding any said node from the at least one stored experience data set that relates to the same geographical location of a said node in the new experience data set, the nodes both corresponding to a same time reference k; and
   adding a said node from the stored experience data set with a time reference k+1 to the candidate set.

4. A method according to claim 1 wherein obtaining the candidate set of nodes includes:
   finding any said node from the place data set that relates to a same geographical location of a said node in the new experience data set; and
   adding a neighbouring said node from the place data set to the candidate set.

5. A method according to claim 1, wherein obtaining the candidate set of nodes includes:
   finding any said node from the at least one stored experience data set that potentially relates to a same geographical location of a said node in the new experience data set according to an image matching algorithm; and
   adding the found node to the candidate set.

6. A method according to claim 5, wherein the image matching algorithm comprises FAB-MAP.

7. A method according to claim 1, wherein obtaining the candidate set of nodes includes:
   finding any said node from the at least one stored experience data set that potentially relates to a same geographical location of a said node in the new experience data set according to geographical location indicators; and
   adding the found node to the candidate set.

8. A method according to claim 7, wherein a said geographical location indicator is based on geographical data produced during capture of the experience data using a Global Positioning System device.

9. A method according to claim 1, wherein checking whether a node in the candidate set matches the node in the new experience data set includes:
   creating a window of nodes ($\{m_c\}_w$) either side of a said node in the candidate set;
   computing transforms from the node ($m^*$) in the new experience data set to each said node in the window;
   if all the transforms are valid then computing translations from the node ($m^*$) in the new experience data set to each said node in the window ($\{m_c\}_w$); and
   if a local minima is found between the node ($m^*$) in the new experience data set and a said node in the window ($\{m_c\}_w$) then the node in the window with a smallest said translation is returned as matching the node ($m^*$) in the new experience data set.

10. A method according to claim 1, wherein a said experience data set further includes data relating to landmarks and the method further includes:
    computing a transform from a said image frame ($F_k$) of a said node in the new experience data set to said nodes in the stored experience data set having landmarks from a region surrounding a previous position of the node in the new experience data set.

11. A method according to claim 10, wherein computing the transform is performed in parallel for a plurality of said image frames in the new experience data set.

12. A method according to claim 10, further including:
    identifying said landmarks in a said experience data set using a FAST corner extractor technique; and
    using a Brief Robust Independent Elementary Features technique to associate corresponding said landmarks in different said experience data sets.

13. Apparatus configured to generate navigation data, the apparatus including:
    a device configured to receive
       a new experience data set relating to a new experience capture, and
       at least one stored experience data set relating to at least one previous experience capture,
       each of the new experience data set and the at least one stored experience data set including a set of nodes, each said node comprising a series of visual image frames relating to a geographical location taken over a series of time frames;
    a device configured to obtain a candidate set of said nodes from the at least one stored experience data set that potentially relate to a same geographical location of a said node in the new experience data set; and
    a device configured to check whether the geographical location of a said node in the candidate set matches the geographical location of the node in the new experience data set, and responsive to the matching, to add, to a place data set usable for navigation, a topological link that relates the node in the candidate set to the matched node in the new experience data set.

14. Apparatus according to claim 13, wherein the place data set is used for navigation by a navigation device on board a vehicle.

15. Apparatus according to claim 13, wherein the new experience data set comprises data received from a sensor operating online on a vehicle and the devices comprise one or more computing devices.

16. A method according to claim 7, wherein a said geographical location indicator is based on geographical data produced during capture of the experience data.

17. A non-transitory computer program product comprising computer code that when executed by one or more processors cause a process to be carried out, the process comprising:
> receiving
>> a new experience data set relating to a new experience capture, and
>> at least one stored experience data set relating to at least one previous experience capture,
>> each of the new experience data set and the at least one stored experience data set including a set of nodes, each said node comprising a series of visual image frames relating to a geographical location taken over a series of time frames;
>
> obtaining a candidate set of said nodes from the at least one stored experience data set that potentially relate to a same geographical location of a said node in the new experience data set;
>
> checking whether the geographical location of a said node in the candidate set matches the geographical location of the node in the new experience data set; and
>
> responsive to the matching, adding, to a place data set usable for navigation, a topological link that relates the node in the candidate set to the matched node in the new experience data set.

18. A non-transitory computer program product according to claim 17, wherein the new experience data set comprises data received from a sensor operating online on a vehicle and the process is performed subsequently offline on a computing device.

19. A non-transitory computer program product according to claim 17, wherein a said experience data set further includes data relating to landmarks and the process further includes:
> computing a transform from a said image frame ($F_k$) of a said node in the new experience data set to said nodes in the stored experience data set having landmarks from a region surrounding a previous position of the node in the new experience data set;
>
> identifying said landmarks in a said experience data set using a FAST corner extractor technique; and
>
> using a Brief Robust Independent Elementary Features technique to associate corresponding said landmarks in different said experience data sets.

20. A non-transitory computer program product according to claim 19, wherein computing the transform is performed in parallel for a plurality of said image frames in the new experience data set.

\* \* \* \* \*